April 15, 1952     J. O. ANTONSON     2,592,844
TIRE CONSTRUCTION
Filed Jan. 13, 1949     3 Sheets—Sheet 1
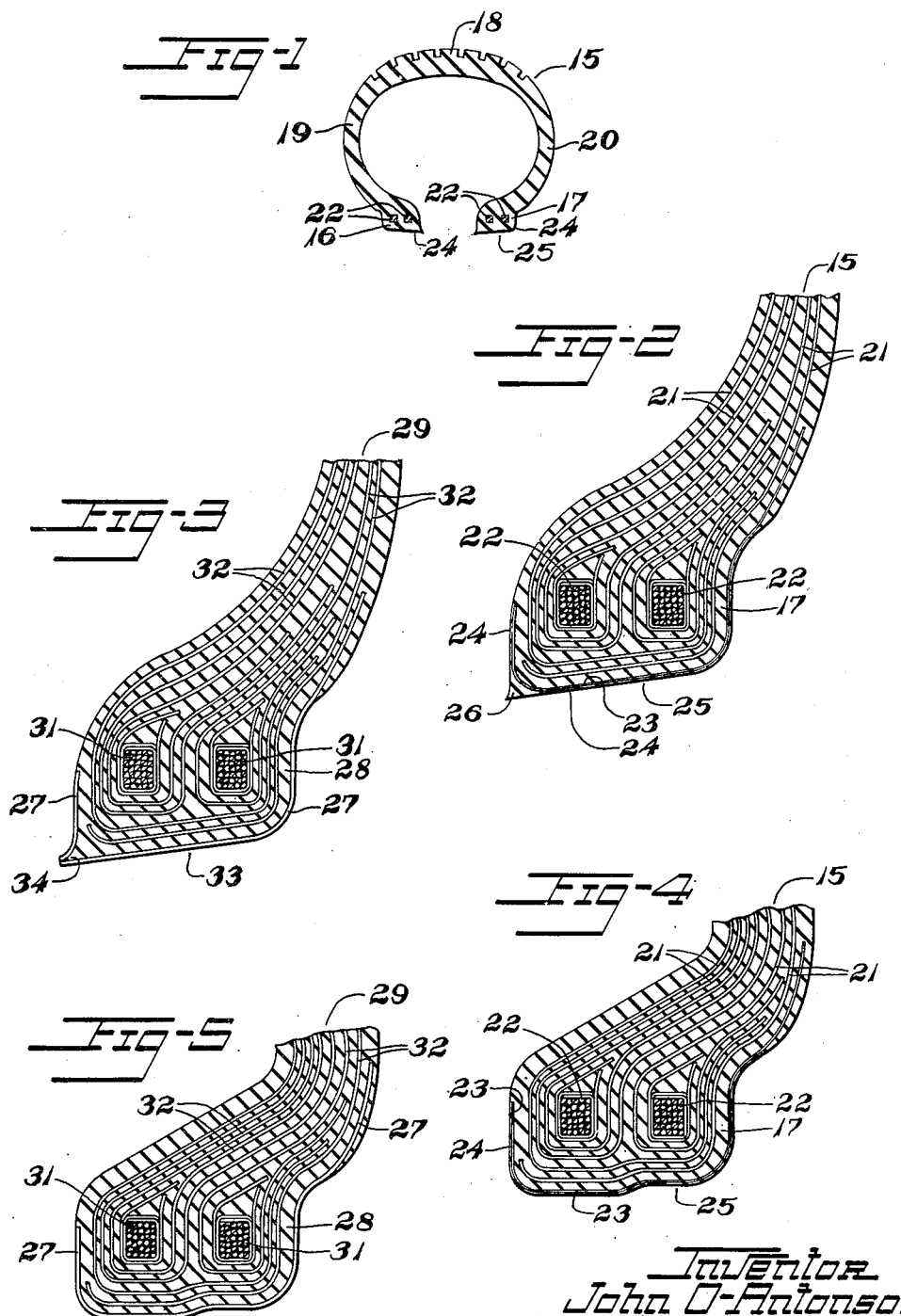
Inventor
John O. Antonson
By Harold S. Meyer
Atty.

April 15, 1952     J. O. ANTONSON     2,592,844
TIRE CONSTRUCTION
Filed Jan. 13, 1949     3 Sheets-Sheet 2
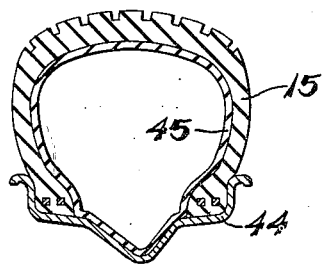
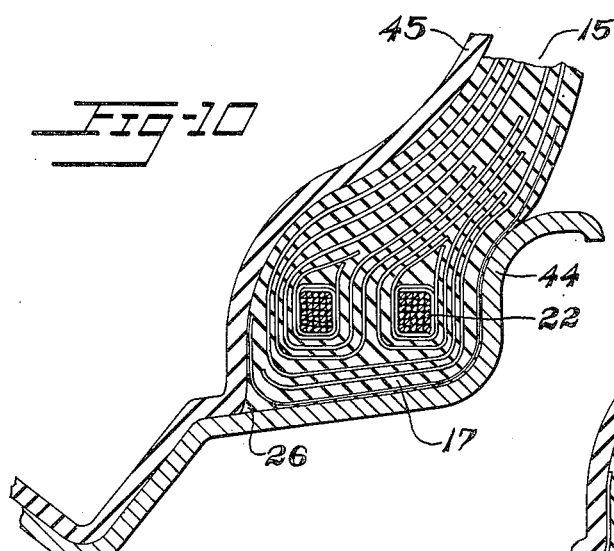
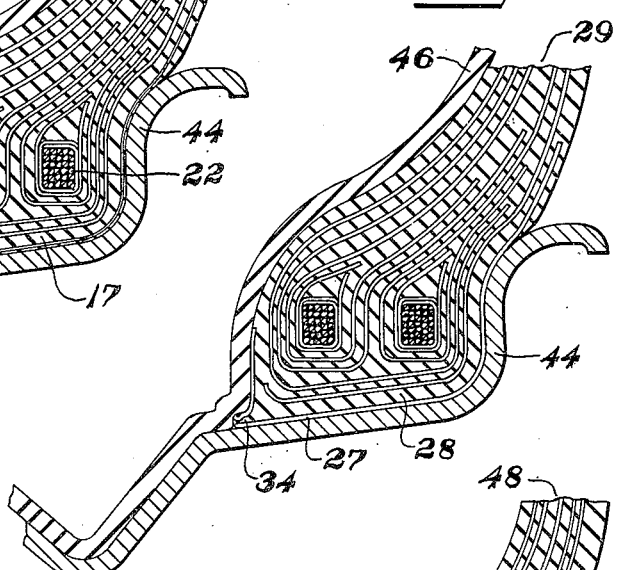
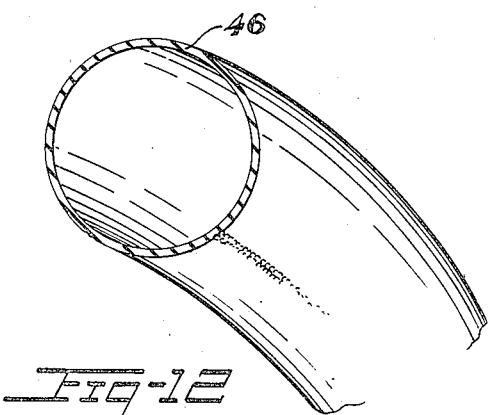
Inventor
John O. Antonson
By Harold S. Meyer
Atty

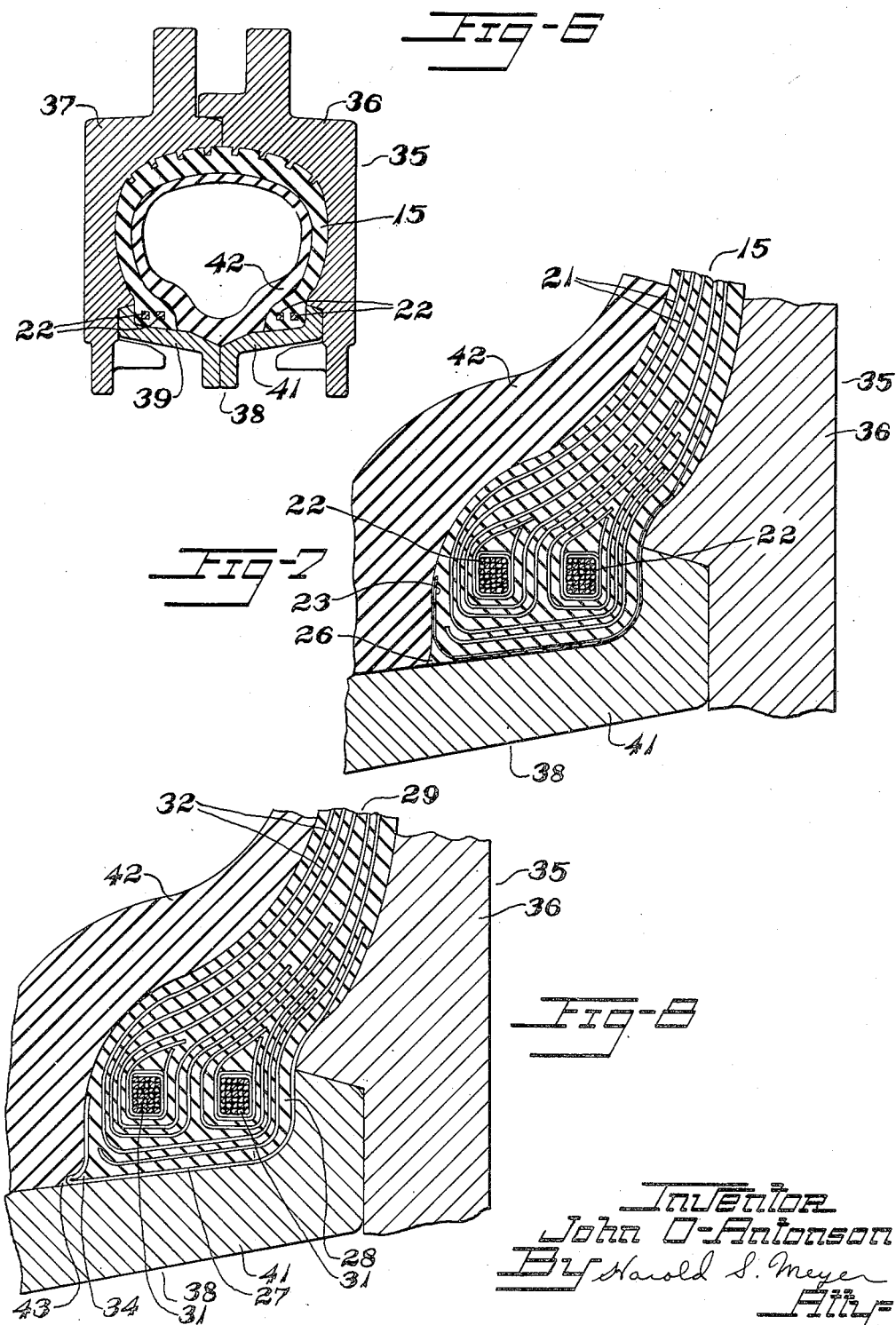

Patented Apr. 15, 1952

2,592,844

UNITED STATES PATENT OFFICE 2,592,844

TIRE CONSTRUCTION

John O. Antonson, Akron, Ohio, assignor to The B. F. Goodrich Company, New York, N. Y., a corporation of New York Application January 13, 1949, Serial No. 70,771

14 Claims. (Cl. 152—362)

This invention relates to tires and especially to improvements in pneumatic tire construction providing bead portions which have non-abrading faces and edges and do not require trimming and buffing after molding.

Heretofore it has been the general practice to use a heavy gauge cotton fabric for the finishing strip or final covering over each bead portion after all the plies have been wrapped around the bead. The cotton fabric tends to flow with the material of the bead portion during molding of the tire. This not only distorts the bead portion of the tire, but also causes injury to the water bag used in molding. The damage to the water bag has consisted of deformation of the water bag shoulder caused by flow of material of the bead portion, sometimes including a fold of the cotton cloth, between the shoulder of the bag and the face of the mold.

The flow of bead portion material between the shoulders of the water bag and the mold has been especially troublesome with tires having thick bead portions as for instance bead portions with more than one wire bead ring. In the molding of tires having thick bead portions the water bag shoulders are lifted temporarily upon the initial application of the fluid pressure within the bag, and the bag consequently exerts pressure first against the portion of the tire and its bead portion remote from the toe of the bead. This pressure tends to cause the material of the bead portions to flow under the shoulders of the bag, and results in the formation of bead toe projections which deform the shoulders when the shoulders are urged toward the mold face after the temporary lifting action ceases.

The toe of the bead portion has had to be trimmed or buffed to remove the projecting edge formed between the water bag shoulder and the mold. In trimming this edge a fold of the finishing strip is usually cut which leaves a rough saw-toothed edge at the toe of the bead portion which is very undesirable because the rough edge rubs against the inner tube and often damages the tube to the point of failure when used in a tire having the prior construction.

The use of heavy gauge cotton for finishing strips is further undesirable in that the thickness of the fabric precludes the application of a protective layer of rubber outward of the finishing strip because it is necessary to keep the thickness of the material between the bead and bead seat to a minimum to prevent excessive rocking of the bead portion.

Objects of this invention are to provide a tire construction which does not have these and other undesirable characteristics, to provide an improved finishing strip, to provide increased resistance to rim chafing, to provide improved molding of the tire bead portion, to provide for retaining the material of the bead portion in place during molding, to provide a bead portion with a soft toe, to provide a smooth bead portion surface, to provide for elimination of trimming, buffing and other finishing operations of the tire bead portion, to provide increased life of the water bag used in molding the tire, to provide a strong bead structure, to provide a minimum of bead toe chafing of inner tubes, to provide for improved appearance and to provide for economy in production and convenience of manufacture.

These and other objects will be apparent from the following description reference being had to the accompanying drawings in which:

Fig. 1 is a section of a tire constructed in accordance with and embodying the invention.

Fig. 2 is a section on an enlarged scale of the bead portion of the tire shown in Fig. 1, parts being broken away.

Fig. 3 is a section like Fig. 2 of a tire bead portion as constructed heretofore.

Fig. 4 is a section of the bead portion shown in Fig. 2 before the molding operation.

Fig. 5 is a section of the bead portion shown in Fig. 3 before the molding operation.

Fig. 6 is a section showing the tire of this invention disposed in a tire mold with a water bag within the tire.

Fig. 7 is a section on an enlarged scale of the bead portion of the tire shown in Fig. 6 showing the relationship of the mold and water bag during the molding operation, parts being broken away.

Fig. 8 is a section like Fig. 7 of a bead portion of a tire as constructed heretofore showing the relationship of the mold and water bag during the molding operation.

Fig. 9 is a section of the tire of this invention in operating position mounted on a rim and containing an inner tube.

Fig. 10 is a section on an enlarged scale of the bead portion, rim, and inner tube shown in Fig. 9, parts being broken away.

Fig. 11 is a section like Fig. 10 showing the bead portion of a tire as constructed heretofore mounted on a rim with an inner tube disposed therein, parts being broken away.

Fig. 12 is a section in perspective of a tube after being used in a tire as constructed heretofore.

Fig. 13 is a section like Fig. 2 of a modified construction of the invention as applied to a tire with only a single wire bead ring in each bead portion.

Referring to the drawings the invention is shown as applied to a tire 15 suitable for use on a vehicle for freight or passengers. The tire 15 shown in Fig. 1 is especially adapted for use on aircraft and comprises an annular body of resilient rubber or other rubber-like material having radially inner wheel-engaging edges or bead portions 16 and 17 connected to a radially outward tread portion 18 by sidewalls 19 and 20.

As shown in detail in Fig. 2, the tire of Fig. 1 contains reinforcing plies 21, 21 of nylon, rayon, cotton or other suitable cords, embedded in the tire and extending from bead portion 16 to bead portion 17. In each of the bead portions 16 and 17 is disposed a pair of circumferentially inextensible beads 22, 22 about which the plies 21, 21 are wrapped to anchor the plies and provide a unitary structure.

An outer covering or finishing strip 23 is wrapped around the bead portion 17 outward of the plies 21, 21 to provide a unitary bead portion structure and protect the tire 15 from rim chafing. In accordance with the invention the finishing strip 23 shown in Fig. 2 consists of a fabric having cords of a suitable heat-shrinkable material such as a high polymeric synthetic organic material which has the property of high thermal recovery at temperatures of tire vulcanization and of which nylon and a material which has been referred to commercially as Trelon or Terelon are examples, the latter material being a polyester of ethylene glycol and terephthalic acid and is described for example in Whinfield and Dickson British Patent 578,079. The finishing strip 23 shown in Fig. 2 is a twilled fabric of tightly woven relatively thin strands of nylon fibers although square woven, weak wefted or weftless fabric may be used.

The fabric of the finishing strip is preferably cut on the bias. If twilled or square woven fabric is used the fabric is preferably cut with the strands at a 45 degree angle and if weftless fabric is used it is preferably cut with the strands at the same angle as the cords of the fabric of the reinforcing plies. The nylon finishing strip 23 has high tensile strength and it has been found that a fabric gauge of .012 inch is suitable for the tire 15 shown in the drawings. The thin fabric which is used in the finishing strip 23 makes possible coating of the strip with a protective layer 24 of rubber or other rubber-like material increasing the total thickness of the strip to .030 inch without increasing the thickness of the bead portion between the beads 22, 22 and bead seat 25. The bead portion 17 in the finished, vulcanized tire has a soft rubber toe 26 and the finishing strip 23 is uncreased and continuous around the bead portion 17 to provide a strong bead portion structure with a smooth outward appearance.

In Fig. 3 a finishing strip 27 and bead portion 28 of a tire 29 as constructed heretofore is shown to illustrate the advantages of the construction of this invention. In the prior construction shown, inextensible beads 31, 31 are disposed in the bead portion 28 and reinforcing plies 32, 32 of suitable fabric such as rayon, cotton or nylon which extend from bead portion to bead portion of the tire are wrapped around the beads 31, 31.

The finishing strip 27 consists of relatively thick, loosely woven cotton fabric which cannot be coated with a protective layer because the coating would cause the thickness between the beads 31, 31 and bead seat 33 to be excessive. Instead, the finishing strip 27 must have the rubber or other rubber-like material applied by frictioning or impregnation which results in a strip having a thickness of .045 inch. This places the finishing strip 27 so close to the surface of the bead portion 28 that a bead portion with a rough surface results. In addition the finishing strip 27 usually becomes folded, and then is broken at the toe 34 of the bead portion 28 by the trimming and buffing operation, which leaves a rough edge at the toe and weakens the bead portion structure because the full strength obtained with a continuous strip is lost.

Fig. 4 shows how the tire of Fig. 1 and Fig. 2 is built. The bead portion 17 of tire 15 in Fig. 4 illustrates the position of the finishing strip 23 when it is first wrapped around the bead. It can be seen that the finishing strip 23 has a layer 24 of protecting rubber or other rubber-like material of substantial thickness coated on the outer surface, and that all corners of the bead portion 17 at this stage are rounded, without any projecting masses of rubber. With the construction of Fig. 3 used heretofore and shown before molding in Fig. 5 the finishing strip 27 is of such a thick gauge that only a very thin layer of rubber or other protective material may be provided by frictioning, which does not provide an effective protection of the finishing strip.

The tire 15 of the construction of this invention may be molded and vulcanized by suitable means such as by a mold 35 shown in Fig. 6. The mold comprises intermeshing encompassing sections 36 and 37 meshing with an inner ring 38 which may be made in sections 39 and 41. A pressure exerting tube such as water bag 42 may be disposed within the tire 15 to urge the tire against the tire-forming surfaces of the mold and particularly of ring sections 39 and 41.

In Fig. 7 an enlarged section of the bead portion of the tire 15 shown in Fig. 6 is shown after the heat and pressure of vulcanization has been applied. The mold 35 is heated by steam or other suitable means to temperatures of around 300° to 350° F., and a molding pressure of about 200 lbs. per square inch is applied by a pressure fluid within the bag 42 while the mold is held closed by suitable mechanical devices of a conventional kind not shown. At this vulcanizing temperature the heat-shrinkable high polymeric textile material, out of which the finishing strip 23 is made, shrinks and tends to contract and bind the bead portion 17 into a strong unitary structure, at the same time that external pressure from the bag 42 compresses the bead portion 17. The tendency of the finishing strip 23 to shrink is also desirable because the strip does not flow with the rubber-like material of the bead portion which is molded by the section 41 of the inner ring 38 of the mold, but the tightly woven finishing strip holds the bulk of the material and retains it in place. Nevertheless, a small portion of the coating 24 on the finishing strip 23 flows, to fill in the corner between the bag 42 and the mold section 41, but only enough to form the desired soft bead toe 26.

With the finishing strip 27 of the construction used heretofore the results have been different as is shown in Fig. 8. The mold sections 36 and 37, the inner ring 38 of the mold and the water bag 42 are the same as are shown in Fig. 6 and the tire is molded at the same temperature. The cotton material of which the finishing strip 27 is made flows with the rubber-like material of the bead portion and as shown in the drawing the finishing strip is moved into the toe 34 of the bead portion so that it becomes pinched-out in protruding fashion and is forced between the shoulder 43 of the water bag 42 and the mold section 41 of the inner ring 38 of the mold 35 by the pressure of the water bag 42 on the thick bead portion 28 during the temporary lifting of the shoulder upon the initial application of molding pressure. The pinched-out fold of cotton fabric and the accompanying rubber-like material which are alowed to flow between the shoulder 43 and mold section 41 deform the shoulder and decrease the effectiveness of the water bag. The deformation of the shoulder 43 increases with the molding of every successive tire 29 of this prior construction and consequently each consecutive tire is molded with a longer toe which must be trimmed. This progressive deformation of the water bag 42 results ultimately in necessity for replacing the water bag long before the material of the bag is worn out.

With the tire 15 having the construction of this invention the water bag 42 is not deformed and is effective until the material of the water bag needs replacing. As shown in Fig. 7 and in Fig. 2 the finishing strip is not pinched-out and does not protrude but maintains its shape in smooth conformance with the plies 21, 21 which it encloses and retains the material of the bead portion in place while providing a soft toe 26 and a minimum of deformation of the water bag shoulder.

Fig. 9 illustrates the position of the tire 15 of this invention when mounted on a drop center rim 44 with a supporting inner tube 45 therein. In Fig. 10 an enlarged sectional view of the bead portion 17 with the adjacent rim 44 and tube 45 is shown. With this construction the soft rubber toe 26 of the bead portion 17 supports the inner tube 45 and forms a smooth surface between the tire 15 and rim over which the inner tube lays. Upon rocking of the bead portion 17 the toe 26 yields and maintains a supporting surface for the tube 45 without abrading the tube.

In Fig. 11 the bead portion 28 of a tire 29 as constructed heretofore is shown in a like position mounted on a rim 44 with an inner tube 46 therein. The toe 34 of the bead portion 28 of this prior construction contains the finishing strip 27 of cotton which has been trimmed to size and leaves a rough abrasive edge at the toe. As shown in the drawings the toe 34 projects into the inner tube 46 because the toe contains hard cotton fabric and is not yieldable. Upon rocking of the bead portion 28 of the tire 29 having this prior construction the rough abrasive toe 34 is rubbed against the inner tube 46 abrading the softer rubber or other rubber-like material of the tube and damaging the tube in a manner such as is illustrated in Fig. 12. The continued abrasion of the tube 46 by the toe of the bead portion is often sufficient to puncture the tube and has been a serious difficulty in the manufacture and operation of tires having finishing strips of cotton.

In the above described drawings the invention has been applied to tires 15, 15 having a wide bead portion 17 containing more than one wire bead 22 to withstand the high stresses encountered in tires which support heavy vehicles. In Fig. 13 is shown a sectional view of a bead portion 47 of a tire 48 for a lighter weight vehicle, in which a single wire bead is sufficient. The bead portion 47 in this tire 48 comprises a single circumferentially inextensible bead 49 about which plies 51, 51, extending from bead portion 47 to the opposite bead portion of the tire are wrapped to provide a strong tire structure. The bead portion 47 has a finishing strip 52 consisting of heat shrinkable high polymeric material such as nylon wrapped around the bead portion at the outer surface and extending circumferentially of the tire and partially into the sidewall of the tire in conformance with the shape of the plies 51, 51 which it encloses. A protective layer 53 of rubber or other suitable rubber-like material is coated on the outward surface of the finishing strip 52, so that a soft yieldable toe 54 will be formed on the bead portion 47 by displacement of a portion of the protective layer 53 in the same manner as has been described for the larger tire 15 of Figs. 1 and 2.

With this construction embodying the invention results are obtained comparable with the results obtained with the tire shown in Figs. 1, 6 and 9 to prolong the life of the water bags 42, 42 and prevent abrasion of the inner tube 45 while providing a strong unitary bead structure having a finishing strip which is not pinched-out and does not protrude at the toe.

The improved construction of this invention has been described and the improvements pointed out in the preceding description. The magnitude of these improvements and the importance of the invention may be further appreciated from the great savings realized in changing from the construction used heretofore to the construction of this invention. Heretofore it has been believed that by using a finishing strip of cotton which is a relatively inexpensive fabric that the greatest economy could be achieved in the manufacture of tires. With the construction of this invention it has been found that although the nylon chafing strips cost from 20 to 69% more than cotton chafing strips, there is a substantial net saving in the production of each tire with the construction of this invention. This saving results from elimination of all trimming and buffing operations after the molding operation and a saving of from 41 to 49% in the cost of replacement water bags used in the molding operation. It can be seen that the improvement achieved by the construction of this invention constitutes a major advance in the art of tire construction.

Variations may be made without departing from the scope of the invention as it is defined in the following claims.

I claim:

1. An inflatable tire comprising a hollow annular body of resilient rubber-like material open at the radially inner portion, said tire having wheel-engaging bead portions at the inner periphery and each of said bead portions having a sheet of heat-shrinkable synthetic polymeric organic material embedded in and completely surrounded by the rubber-like material of said tire in close proximity to the outer faces of the bead portions.

2. An inflatable tire comprising a hollow annular body of resilient rubber-like material open at the radially inner portion, said tire having wheel-engaging bead portions at the inner periphery and each of said bead portions having a sheet of heat-shrinkable synthetic polymeric organic material embedded in and completely surrounded by the rubber-like material of said tire in close proximity to the outer faces and extending a limited distance beyond the wheel-engaging area of the bead portions.

3. An inflatable tire comprising a hollow annular body of resilient rubber-like material open at the radially inner portion, said tire having wheel-engaging bead portions at the inner periphery and each of said bead portions having a sheet of heat-shrinkable synthetic polymeric organic material embedded in and completely surrounded by the rubber-like material of said tire in close proximity to the outer faces and extending a limited distance beyond the wheel-engaging area of the bead portions at the inside and outside of the tire.

4. An inflatable tire comprising a hollow annular body of resilient rubber-like material open at the radially inner portion, said tire having wheel-engaging bead portions at the inner periphery and each of said bead portions having a sheet of heat-shrinkable material embedded in and completely surrounded by the rubber-like material of said tire in close proximity to the outer faces of the bead portions, and said sheet consisting of cords of synthetic high polymeric organic textile material which has the property of thermal recovery at temperatures of tire vulcanization.

5. An inflatable tire comprising a hollow annular body of resilient rubber-like material open at the radially inner portions, said tire having wheel-engaging bead portions at the inner periphery and each of said bead portions having a sheet of nylon material embedded in and completely surrounded by the rubber-like material of said tire in close proximity to the outer faces of the bead portions.

6. A pneumatic tire comprising a hollow annular body of resilient rubber-like material open at the radially inner portion, said tire having wheel-engaging bead portions at the inner periphery, reinforcing plies of sheet material embedded in said body and extending between said bead portions, each of said bead portions having a sheet of heat-shrinkable synthetic polymeric organic material embedded in and completely surrounded by the rubber-like material of said tire outward of said plies and in close proximity to the outer faces of the bead portions and said sheet being substantially thinner than said reinforcing plies.

7. An inflatable tire comprising a hollow annular body of resilient rubber-like material open at the radially inner portion, said tire having wheel-engaging bead portions at the inner periphery and each of said bead portions having a sheet of heat-shrinkable synthetic polymeric organic material embedded in and completely surrounded by the rubber-like material of said tire in close proximity to the outer faces of the bead portions, and said sheet extending transversely of said tire in unfolded non-protruding disposition at said bead portions.

8. A method of making a tire comprising forming a hollow toroidal body of resilient rubber-like material open at the inner periphery, wrapping an edge portion of said body with a sheet of synthetic polymeric organic material heat-shrinkable at temperatures of tire vulcanization coated with a layer of said resilient rubber-like material and heating said body to a temperature at which the rubber-like material of said body and of said sheet is vulcanized together and the material of said sheet shrinks and by such shrinking action resists protruding flow of said sheet to provide said edge portion in the completed tire with said sheet conforming smoothly to the tire material within said sheet and being completely surrounded by said rubber-like material.

9. A method of making a tire comprising forming a hollow toroidal body of resilient rubber-like material open at the inner perpihery, wrapping an edge portion of said body with a sheet of synthetic polymeric organic material heat shrinkable at temperatures of tire vulcanization coated with a layer of said resilient rubber-like material, placing said body and attached sheet in a tire-forming mold and heating said body under molding pressure to a temperature at which the rubber-like material of said body and of said sheet is vulcanized together and the material of said sheet shrinks and by such shrinking action resists protruding flow of said sheet to provide said edge portion in the completed tire with said sheet conforming smoothly to the tire material within said sheet, and being completely surrounded by said resilient rubber-like material.

10. A method of making a tire comprising forming a hollow toroidal body of resilient rubber-like material open at the inner periphery, wrapping an edge portion of said body with a sheet of heat-shrinkable material heat shrinkable at temperatures of tire vulcanization and coated with a layer of said resilient rubber-like material, placing said body around an inflatable pressure exerting tube of resilient rubber-like material and within a tire-forming mold and heating said body under molding pressure to a temperature at which the rubber-like material of said body and of said sheet is vulcanized together and at which said sheet shrinks and by such shrinking action resists protruding flow of said sheet to provide said edge portion in the completed tire with said sheet conforming smoothly to the tire material within said sheet, and being completely surrounded by said resilient rubber-like material.

11. A method of making a tire comprising forming a hollow toroidal body of resilient rubber-like material open at the inner periphery, wrapping an edge portion of said body with a sheet of fabric consisting of cords of synthetic organic high polymeric textile material which has the property of thermal recovery at temperatures of tire vulcanization and which is coated with a layer of said resilient rubber-like material, placing said body around an inflatable pressure-exerting tube of resilient rubber-like material and within a tire-forming mold and heating said body under molding pressure to a temperature at which the rubber-like material of said body and of said sheet is vulcanized together and at which the material of said sheet shrinks and by such shrinking action resists protruding flow of said sheet to provide said edge portion in the completed tire with said sheet conforming smoothly to the tire material within said sheet, and being completely surrounded by said resilient rubber-like material.

12. A method of making a tire comprising forming a hollow toroidal body of resilient rubber-like material open at the inner periphery, wrapping an edge portion of said body with a sheet of fabric consisting of cords of nylon coated with a layer of said resilient rubber-like material, placing said body around an inflatable pressure-exerting tube of resilient rubber-like material and within a tire-forming mold and heating said body under molding pressure to a temperature of from 300° to 350° F. at which the rubber-like material of said body and of said sheet is vulcanized together and at which the nylon cords of said sheet shrink and by such shrinking action resists protruding flow of said sheet to provide said edge portion in the completed tire with said sheet conforming smoothly to the tire material within said sheet, and being completely surrounded by said resilient rubber-like material.

13. An inflatable tire comprising a hollow annular body of resilient rubber-like material terminating in bead portions having toes at their axially and radially inner edges, circumferentially endless bead rings disposed in said bead portions, reinforcing plies embedded in said annular body and extending from bead portion to bead portion and wrapped about said bead rings, each of said bead portions having a sheet of heat-shrinkable synthetic organic polymeric material wrapped about said reinforcing plies and embedded in and completely surrounded by the rubber-like material of the bead portion in smooth conformance with said reinforcing plies in the region of said toes.

14. The method of making a tire of reinforced rubber-like material terminating in bead portions having bead rings therein, which method comprises assembling the body materials with the rubberized reinforcing material wrapped around said bead rings smoothly in the toe regions of the bead portions, wrapping smoothly about said reinforcing material and bead rings in the toes of the beads sheet synthetic organic material having the property of shrinking under the heat of tire vulcanization and being coated with a layer of said rubber-like material, molding and vulcanizing the tire and effecting shrinkage of said sheets by application of the heat of vulcanization to resist, by such shrinking action, protruding flow of such sheets to provide in the completed tire integral molded bead portions in which said sheets conform smoothly to the underlying reinforcing material in the regions of the toes of the bead portions and are completely surrounded by said rubber-like material.

JOHN O. ANTONSON.

REFERENCES CITED

The following references are of record in the file of this patent:

UNITED STATES PATENTS

| Number | Name | Date |
| --- | --- | --- |
| 1,687,945 | Marquette | Oct. 16, 1928 |
| 1,747,533 | Sessions | Feb. 18, 1930 |
| 1,849,625 | Jenkinson | Mar. 15, 1932 |
| 1,918,553 | Musselman | July 18, 1933 |
| 2,349,290 | Loughborough | May 23, 1944 |
| 2,444,903 | Van Buren | July 6, 1948 |
| 2,468,304 | Musselman | Apr. 26, 1949 |
| 2,476,884 | Maynard | July 19, 1949 |

FOREIGN PATENTS

| Number | Country | Date |
| --- | --- | --- |
| 272,282 | Great Britain | 1927 |